United States Patent [19]

Lyons, Jr. et al.

[11] 4,436,545

[45] Mar. 13, 1984

[54] PROCESS HAVING THE TWO-FOLD RESULT OF THE DISPOSAL OF WASTE PICKLE LIQUOR AND THE PRODUCTION OF FERTILIZER

[75] Inventors: Donald W. Lyons, Jr., Fort Scott, Kans.; Everette L. Wyatt, Carthage, Mo.

[73] Assignee: Leggett & Platt, Incorporated, Carthage, Mo.

[21] Appl. No.: 403,424

[22] Filed: Jul. 30, 1982

[51] Int. Cl.³ .............................................. C05C 9/00
[52] U.S. Cl. ......................................... 71/25; 71/28; 71/64.1; 423/DIG. 2
[58] Field of Search ............... 423/DIG. 2; 71/25, 28, 71/64.1

[56] References Cited

U.S. PATENT DOCUMENTS

| | | | |
|---|---|---|---|
| 2,775,508 | 12/1956 | Thomsen | 423/DIG. 2 |
| 2,845,332 | 7/1958 | Allison et al. | 423/DIG. 2 |
| 3,167,390 | 1/1965 | Simpson et al. | 23/100 |
| 3,232,738 | 2/1966 | Bahme | 71/25 |
| 3,640,698 | 2/1972 | Backlund | 71/29 |
| 4,116,664 | 9/1978 | Jones | 71/29 |
| 4,310,343 | 1/1982 | Verdegaal et al. | 71/28 |

*Primary Examiner*—Ferris H. Lander
*Attorney, Agent, or Firm*—Wood, Herron & Evans

[57] ABSTRACT

A process having the two-fold result of the disposal of waste pickle liquor and the production of a highly useful fertilizer in which urea is mixed with waste pickle liquor to produce a stable liquid fertilizer.

11 Claims, No Drawings

PROCESS HAVING THE TWO-FOLD RESULT OF THE DISPOSAL OF WASTE PICKLE LIQUOR AND THE PRODUCTION OF FERTILIZER

BACKGROUND OF THE INVENTION

This invention relates to the disposal of waste pickle liquor and, more particularly, to the production of stable liquid fertilizers from waste pickle liquors which remain after ferrous articles have been pickled, e.g., in dilute sulfuric acid pickling baths.

In the manufacture of ferrous metal articles in the form of sheet, strip, wire, rod, bar, section or tubing, for example, it is common practice to treat the surface thereof in an acid pickling bath such as aqueous solutions of sulfuric acid to remove scale or oxide from the surface of such shapes. That is, during manufacturing operations in which the ferrous metal articles may be heated and drawn or rolled, the surfaces of the ferrous metal articles become oxidized either by the hot rolling or drawing operations themselves or in heat treatments between operations. Such oxidation forms a scale on the surfaces of the articles. The oxide scale needs to be removed before subsequent drawing or rolling operations otherwise it becomes forced into the metal with resultant defects. Pickling is also necessary to remove oxide scale to reduce wear on tools. Pickling of ferrous metal articles is accomplished by immersing the metal in a bath or vat of dilute acid typically sulfuric acid usually on the order of 8 to 10% by weight sulfuric acid at a temperature in the range of 140° to 160° F. As the pickling bath continues to be used, the acid solution becomes charged with iron salts such as ferrous sulfate and gradually decreases in acid strength. When the strength of the bath decreases to about 5% or less sulfuric acid by weight, the bath is considered waste and must be pumped out and be replaced with a fresh acid solution.

Generally speaking, it has not proved economic to recover either the acid or the iron content of waste pickle liquor on any large scale. Consequently, the great bulk of the millions of gallons of waste pickle liquor produced every year in the manufacture of ferrous metal articles must be disposed of as waste. These materials are, of course, environmentally unacceptable, and thus they require special handling and their disposal costs are extremely high.

SUMMARY OF THE INVENTION

It is an object of the present invention to provide a process for the disposal of waste pickle liquor without hazard to the environment and without incurring the extremely high cost of disposal. It is a concomitant object of this invention to produce a highly useful stable liquid fertilizer from waste pickle liquor in a highly economic process.

These and other objects and advantages are provided by a two-fold process for the disposal of waste pickle liquor and the production of a useful fertilizer wherein dry urea is mixed with waste pickle liquor to produce a stable liquid fertilizer. In a presently preferred form of the invention, prilled urea containing approximately 46% by weight nitrogen is mixed with and dissolved in waste sulfuric acid pickle liquor which is at a temperature of 140° to 160° F. as required in the pickling process. No additional heat is required. Rather, the process uses the waste heat from the steel pickling operation. Little or no agitation is required. The resulting product is a very stable liquid fertilizer having a urea-ferrous sulfate combination which makes a superior fertilizer.

The contribution that the present invention makes in solving the problem of disposing of waste pickle liquor can be appreciated by noting the many advantages of the process of the present invention. Among these advantages are the following.

(1) The present invention permits the disposal and utilization of waste pickle liquor either at the site of the metal treatment process or offsite. That is, the waste pickle liquor can be used in the process to manufacture fertilizer as an adjunct to the processing of the metal articles or at some other location. This is possible because no special equipment is needed since the process can be carried out in a tank or vat with little or no mixing equipment; and, furthermore, the process can employ the waste heat of the steel pickling process to dissolve the dry urea and thus no additional energy is required in the process. In fact, the process can be carried out in the pickling tub itself.

(2) A material which is considered a hazardous waste expensive to dispose of or recycle can now be economically disposed of and, moreover, produce a valuable fertilizer.

(3) The process also can use "distressed" or off-specification urea prills making the entire process based on materials which have previously been considered as wastes.

(4) The product resulting from the process is a stable liquid fertilizer in which no precipitates are present. Thus, the fertilizer product is easy to manufacture, to store and to apply through conventional fertilizer spray application apparatus. There is no drying required in the process nor is it necessary to redissolve the fertilizer prior to application. Ferrous sulfate, which is present in waste sulfuric acid pickle liquor, does not have to be precipitated to be used, nor is it necessary to add ferrous sulfate heptahydrate crystals to make a fertilizer.

(5) The sulfuric acid pickle liquor-urea combination produces a synergistic effect which depresses the isotherm and produces a stable solution of ferrous sulfate. Thus, the resulting fertilizer has a low "salt out" temperature such that it can freeze and thaw without producing iron sulfate precipitates. This is in contrast to other ferrous sulfate solutions that salt out at about 20° C. The low salt out temperature is important since it allows the liquid fertilizer to be stored in bulk quantities for extended periods of time with no special provisions being taken to prevent freezing of the liquid.

(6) The liquid fertilizer has a high nitrogen content and a higher iron content than previous liquid iron sources produced by extremely expensive processes. Urea nitrogen in the fertilizer is absorbed foliar by plants much quicker and more efficiently than ammoniacal forms of nitrogen. The urea-ferrous sulfate combination exhibits a synergistic effect which increases the ability of the plant to absorb the fertilizer and translocate it. Moreover, the iron remains available for absorption by plants even in high pH calcareous soils which have a tendency to render iron salts insoluble and unavailable for plant feeding.

(7) The liquid fertilizer has a desirable clear green color which is superior to that of other iron solutions thus increasing its marketability.

Other objects and advantages of the present invention will become apparent from the following detailed description of the invention.

DETAILED DESCRIPTION OF THE INVENTION

The process involves the use of two starting materials: waste pickle liquor and dry urea. It is desired that the acid content of the waste pickle liquor be at least about 3% by weight to maintain the solubility of the iron in solution. Furthermore, it is desired that the iron content in the final product produced by the process be at least about 2% by weight iron at a 15% by weight nitrogen content. Thus, it is necessary that the iron content in the pickle liquor be at least about 3% by weight iron. Thus, as used herein, the term "waste pickle liquor" refers to an acid solution containing at least about 3% by weight acid and at least about 3% by weight iron. A typical waste product from a sulfuric acid pickling operation contains about 5% sulfuric acid and 40% ferrous sulfate with the balance being water, which falls in the above definition of waste pickle liquor. Although sulfuric acid pickling baths are commonly used in the ferrous metal industry, other pickling baths used in cleaning ferrous metals, e.g., nitric acid baths and hydrochloric acid baths, may also be used in the process of the present invention. In conventional pickling operations, the pickle liquor is maintained at a temperature at 140° to 160° F. to increase the efficiency of the pickling or cleaning action of the acid. The process of the present invention can be carried out at this temperature whereby utilizing the waste heat of the pickling process to aid in the dissolution of the dry urea. Thus, it is not necessary to add any additional heat to the pickle liquor. However, ferrous sulfate crystallizes out of the solution at a temperature less than about 90° F. To avoid the formation of ferrous sulfate crystals, it is therefore desirable to maintain the temperature of the solution above about 90° F.

The urea used may be commercial grade prilled urea fertilizer which is widely used as a source of nitrogen. Prilled urea contains approximately 46% nitrogen. Moreover, "distressed" or off-specification urea prills can be used in the process making both of the starting materials what have previously been considered wastes. The urea prills are mixed with the waste pickle liquor merely by adding the prills to the waste pickle liquor. No special mixing equipment is required as very little agitation is needed. Thus, the urea prills can be added in bult to a tank of waste pickle liquor merely by augering them into the tank. In fact, the process can be carried out in the pickling tank itself. It has been found that the urea prills slowly dissolve in the pickle liquor resulting in the formation and maintenance of a stable liquid fertilizer solution. As used herein, a "stable" solution is one where no precipitates are formed such as precipitates of insoluble iron salts. Thus, the liquid fertilizer material is simple to produce and to convey by pumping since no solids or precipitates are present.

When the urea is dissolved in the pickle liquor which takes only several minutes, the process is completed. The resulting liquid fertilizer is stable and may be then pumped out of the tank to storage whereby the liquid fertilizer may be sold in bulk quantities or placed in drums. Other plant nutrients may be added as crystals and dissolved in the solution, if desired, including zinc sulfate, manganese and magnesium.

A presently preferred nitrogen content in the liquid fertilizer is in the range of 10 to 23% nitrogen. By mixing two parts by weight pickle liquor with one part by weight urea, the resulting fertilizer contains approximately 15% by weight nitrogen. By employing spent pickle liquor having an iron content of about 9% by weight, the resulting fertilizer also has a relatively high iron content on the order of 6% by weight iron. This is above most other iron solutions which typically are on the order of less than 5% weight iron but which are also very expensive to produce and very unstable.

It has been found surprisingly that the presence of urea depresses the isotherm to the point that the ferrous sulfate will not precipitate out at lower temperatures in contrast to other ferrous sulfate solutions that salt out at approximately 20° C. Thus, the fertilizer produced by the present process can actually freeze and thaw without the creation of precipitates. This is important since it allows the fertilizer to be stored in bulk quantities for extended periods of time without special provisions being made to prevent freezing of the liquid fertilizer. The fertilizer being a liquid is also easy to apply by conventional spraying apparatus now available. Since no precipitates are present, there is no problem with plugging of spray nozzles.

It has been found that the fertilizer produced by the present process is highly effective. The nitrogen being present in urea-form is capable of being absorbed through the leaves of the plant much quicker and more efficiently than nitrogen in ammoniacal form. Moreover, the urea-ferrous sulfate combination has been found to exhibit a synergistic effect which increases the ability of plants to absorb the fertilizer and translocate it. Another desirable characteristic of the fertilizer is that the urea inhibits the undesirable reaction of the iron with other elements in certain soil conditions which would otherwise render the iron insoluble and unavailable for absorption by the plant. That is, in calcareous soils, i.e., those which are highly basic, inorganic iron salts have a tendency to either oxidize or to react with the calcium, phosphate, or magnesium which is present in the soil rendering them insoluble and unavailable for plant feeding. Thus, inorganic salts of iron or iron oxides have been unsuccessful, even those consisting of ferrous sulfate or ammoniacal ferrous sulfate, in soil applications to treat iron deficiencies. These compounds moreover have had limited effectiveness as a foliar treatment because of the inability of the plant leaves to absorb nitrogen not in the urea form. This has resulted in the expensive practice of adding organic acids to the iron solutions to prevent the iron from reacting with the other minerals rendering it unavailable as a plant food.

In contrast, the liquid fertilizer produced by the present process provides a source of high nitrogen content on the order of 15% by weight nitrogen which can be absorbed by the leaves of the plants. Thus, this fertilizer may be applied to plants by spraying of the liquid on the plant leaves. Still further, the iron is available in a form in which it can be translocated by the plant and not rendered insoluble by higher pH soils. Tests of the fertilizer have confirmed its usefulness as a plant food.

The fertilizer also has a clear green color which is pleasing increasing its marketability. Other iron solutions used as fertilizers are darkish brown or mud-like in color in contrast to the clear green color produced by the present process.

In summary, the present invention provides a simple, very economic solution to the problem of disposing of waste pickle liquor which plagues the ferrous metal forming industry. The present invention not only solves the waste pickle liquid disposal problem but also produces a highly effective and useful stable liquid fertilizer having a relatively high iron and nitrogen content in a form permitting foliar application of the nitrogen and increased availability of the iron as a plant food. The process and resulting product have numerous advantages over prior art processes.

We claim:

1. A process for the disposal of waste pickle liquor from a ferrous metal treating operation and the production of a useful fertilizer comprising mixing urea in waste sulfuric acid pickle liquor at a temperature sufficient to avoid substantial formation of iron precipitate whereby a liquid fertilizer having an iron content of at least about 3% by weight is produced comprising a stable urea-iron sulfate combination which does not salt out at a temperature of 20° C.

2. The process of claim 1 wherein the nitrogen content of the liquid fertilizer is in the range of about 10% to 23% nitrogen by weight.

3. The process of claim 1 wherein the nitrogen content of the liquid fertilizer is about 15% nitrogen by weight.

4. The process of claim 1 wherein the temperature of the pickle liquor is above about 90° F.

5. The process of claim 4 wherein the temperature of the pickle liquor is in the range of 140° to 160° F.

6. The process of claim 1 wherein the urea is prilled urea.

7. The process of claim 3 wherein the iron content of the liquid fertilizer is about 6% by weight.

8. A process for the disposal of waste pickle liquor from a ferrous metal treating operation and the production of a useful fertilizer comprising the step of dissolving dry urea in a waste pickle liquor solution comprising at least about 3% by weight sulfuric acid and at least about 3% by weight iron present as iron sulfate, the temperature of said waste pickle liquor solution being at least about 90° F. whereby a liquid useful as a fertilizer, including a foliar feed fertilizer, having an iron content of at least about 3% by weight and a nitrogen content in the range of about 10% to 23% by weight is produced comprising a stable urea-iron sulfate combination which does not salt out at a temperature of 20° C.

9. The process of claim 8 wherein the nitrogen content of the liquid fertilizer is about 15% by weight and the iron content is about 6% by weight.

10. A process having the two-fold result of disposing of waste pickle liquor and producing a useful fertilizer therefrom comprising the steps of:
    (a) providing waste pickle liquor containing at least about 3% by weight sulfuric acid and at least about 9% by weight iron as iron sulfate at a temperature above about 90° F., and
    (b) dissolving in said waste pickle liquor prilled urea in a ratio of about two parts by weight pickle liquor to about one part by weight urea whereby a useful fertilizer is produced, including a foliar feed fertilizer, having an iron content of at least about 6% by weight and a nitrogen content of at least about 15% by weight comprising a stable urea-iron sulfate combination which does not salt out at a temperature of 20° C.

11. A process for the disposal of waste pickle liquor from a ferrous metal treating operation and the production of a useful fertilizer comprising mixing urea in waste pickle liquor at a temperature sufficient to avoid substantial formation of iron precipitate whereby a liquid fertilizer having an iron content of at least about 3% by weight is produced comprising a stable combination of urea and the iron salt of the waste pickle liquor which does not salt out at a temperature of 20° C.

* * * * *